US008442750B1

(12) United States Patent
Tran et al.

(10) Patent No.: US 8,442,750 B1
(45) Date of Patent: May 14, 2013

(54) REMOTELY CONTROLLED TRAFFIC MANAGEMENT SYSTEM

(75) Inventors: Nghia X. Tran, San Diego, CA (US); Michael Bruch, San Diego, CA (US); Rich Adams, Chula Vista, CA (US); Aaron B. Burmeister, San Diego, CA (US); Amin Rahimi, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 359 days.

(21) Appl. No.: 13/006,261

(22) Filed: Jan. 13, 2011

(51) Int. Cl.
*G06F 19/00* (2011.01)

(52) U.S. Cl.
USPC ............ 701/117; 701/118; 340/905; 340/907

(58) Field of Classification Search .......... 701/117–120; 340/905, 906, 907
See application file for complete search history.

(56) References Cited

U.S. PATENT DOCUMENTS 5,673,039 A * 9/1997 Pietzsch et al. ............... 340/905

* cited by examiner

*Primary Examiner* — Gertrude Arthur Jeanglaude
(74) *Attorney, Agent, or Firm* — Arthur K. Samora; Kyle Eppele

(57) ABSTRACT

A traffic control system can include a remote control station and a plurality of traffic control assets. Each asset is networked to the control station with a radiofrequency (RF) transceiver and an electronic control unit (ECU). The ECU can receive commands from the control station. In response, ECU can activate a light, or an audio device that is located on the traffic control asset. To move and position the traffic control asset can include at least two wheels and a corresponding motor for each wheel, which can be operated by the ECU to maneuver the traffic control asset according to the user's needs. The traffic asset can be a stop sign or a traffic cone. In some instances, the traffic control asset can have a flat configuration, for convenient storage and a deployed configuration, which can be established from the control station.

10 Claims, 5 Drawing Sheets

REMOTELY CONTROLLED TRAFFIC MANAGEMENT SYSTEM

FEDERALLY-SPONSORED RESEARCH AND DEVELOPMENT

This invention (Navy Case No. 100563) is assigned to the United States Government and is available for licensing for commercial purposes. Licensing and technical inquires may be directed to the Office of Research and Technical Applications, Space and Naval Warfare Systems Center, San Diego, Code 72120, San Diego, Calif. 92152; voice (619) 553-2778; e-mail T2@spawar.navy.mil.

FIELD OF THE INVENTION

This invention pertains to systems and methods for monitoring pedestrian and vehicular traffic. More particularly, the invention pertains to systems for quick and effective deployment of traffic control assets, which can be controlled from a remote station via a wireless network to manipulate traffic flow.

BACKGROUND OF THE INVENTION

At many security gates, and in areas where there is a high rate of pedestrian and/or vehicle traffic, traffic cones and other traffic control assets can be used to control the flow of traffic. For example, at many elementary schools during periods when students are arriving and leaving, volunteers (parents or assigned students) hold stop signs and walk back and forth across the streets to signal vehicles to stop and let children cross the street. Similarly, at construction sites, construction workers often use hand signs or stop/yield traffic signs to control traffic flow. Other examples where traffic must be controlled include vehicles that are exiting from stadium parking lots after sporting events and concerts. For all of these examples, traffic control assets such as traffic cones, stop signs, yield signs and the like often must be manually maneuvered by a user at the site to control the traffic. There are often time when this task cannot be accomplished safely, either because of the volume traffic to be controlled (whether vehicle or pedestrian), or because of the speed of the traffic (primarily for vehicular traffic management).

In view of the above, one object of the present invention is to provide a remotely controlled traffic management system that can function as a robotic road guard system to provide traffic management and control tools for security forces. Another object of the present invention is to provide a remotely controlled traffic management system that does not require human intervention at the site where the traffic is being controlled. Still another object of the present invention is to provide remotely controlled traffic management systems that allow for deployment and maneuvering of traffics assets from a remote control station. Still another object of the present invention according to several embodiments is to provide a remotely controlled traffic management system that quickly deploys signal traffic assets on roads and sidewalks, in buildings at security stations and gates, conference events, schools, etc. and remotely maneuvers the assets as desired by the remote user in real-time, according to changing traffic conditions at the site. These and other advantages of the invention, as well as additional inventive features, will be apparent from the description of the invention provided herein.

SUMMARY OF THE INVENTION

A traffic control system and methods for use therefore in accordance with several embodiments can include a control station and a plurality of traffic control assets in network communication with the control station. Each traffic control asset can include a radiofrequency (RF) transceiver and an electronic control unit (ECU). The RF transceiver and ECU allow the traffic control assets to further establish a network of traffic control assets, which can be remotely controlled from the control station. Or, the network of traffic control assets can be configured so any of the assets can be selectively configured as the control station.

The ECU can receive activation commands and movement commands from the control station. In response to the activation commands, ECU can activate a light, or an audio device that on the traffic control asset. In some instances, the traffic control device can be a stop sign that includes a base, a sign portion hingedly connected to the base at one edge, and an actuator that interconnects the base and the sign portion. For these instances, the ECU can activate the actuator, which can operate to pivot the stop sign from a storage position, wherein the sign portion lays proximate the base and substantially horizontal, to a deployed position, wherein the sign portion is substantially vertical. For traffic control assets that are cones, the cones can have a selectively collapsing configuration, wherein a telescoping cone portion is attached to the base so that the cone is somewhat flat when in a storage state. In response to a signal from the ECU to the actuator, the cone portion can be extended away from the base by an actuator to establish the traffic cone. Or, the cone portion can be a bladder that is attached to the base and inflated in response to the ECU signal, to thereby establish the traffic cone.

To move and position the traffic control assets, the traffic control system according to several embodiments can include a locomotive means that is in signal communication with the ECU. The locomotive means can include at least two wheels and a corresponding motor for each wheel. Each motor is connected the ECU. The motors can be operated either singly or in tandem in response to a signal received from the ECU (which is representative of the command the ECU received from the control station). This operation of the motors can be transferred to the wheels to slide or pivot in a manner that re-positions the traffic control asset to divert vehicular and/or pedestrian traffic according to the user's needs. Each traffic control asset can further various combinations of flashing lights, audio devices, cameras, motion sensors and other similar type devices, which can be activated or deactivated from the control station to manipulate traffic flow according to the user's needs.

BRIEF DESCRIPTION OF THE DRAWINGS

The novel features of the present invention will be best understood from the accompanying drawings, taken in conjunction with the accompanying description, in which similarly-referenced characters refer to similarly referenced parts, and in which.

DETAILED DESCRIPTION OF THE EMBODIMENTS

Figure 1:
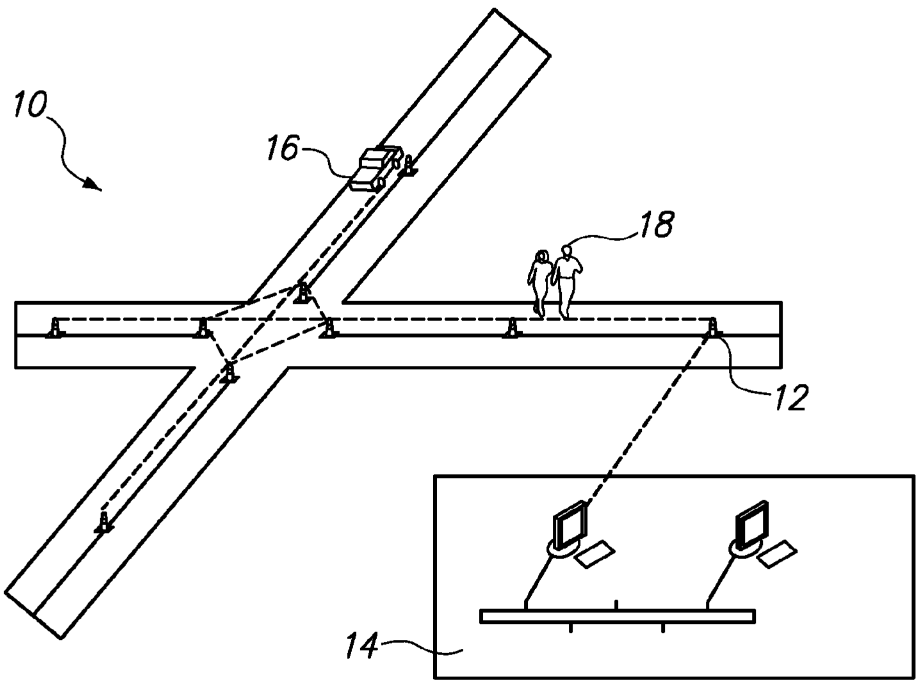
FIG. 1 is a general diagram of a traffic control system in accordance with several embodiments of the invention.

Referring initially to FIG. 1, a remotely controlled traffic management system in accordance with several embodiment of the present invention can be shown and can be generally designed by reference character 10. As shown in FIG. 1, the system 10 can include a plurality of traffic control assets 12, which can communicate both with each other and with a remote station 14 to establish the networked management system 10. The system 10 can be used to monitor and control vehicles 16, pedestrians 18, or a combination thereof, according to the user's needs. One example of such a situation is the need to control and manage both pedestrians 18 and vehicles 16 in the area immediately surrounding a stadium after an event such as a concert or sporting event. In such situations, the system 12 can be quickly and safely deployed to an intersection area in response to changing concentrations of vehicles 16 and pedestrians 18.

As mentioned above, the structure of the traffic control assets 12 and cooperation of structure of assets 12 with remote station 14 allow for safe, real-time re-positioning of the assets 12 to accommodate changes in traffic patterns. Further, the user (not shown) at the remote control station can command pedestrians 18 and vehicles 16 to stop or wait via sound commands and/or visual command that can be transmitted through the closest asset 12 to the applicable vehicle 16/pedestrian 18. The manner in which this can be accomplished can be described more fully below.

Figure 2:
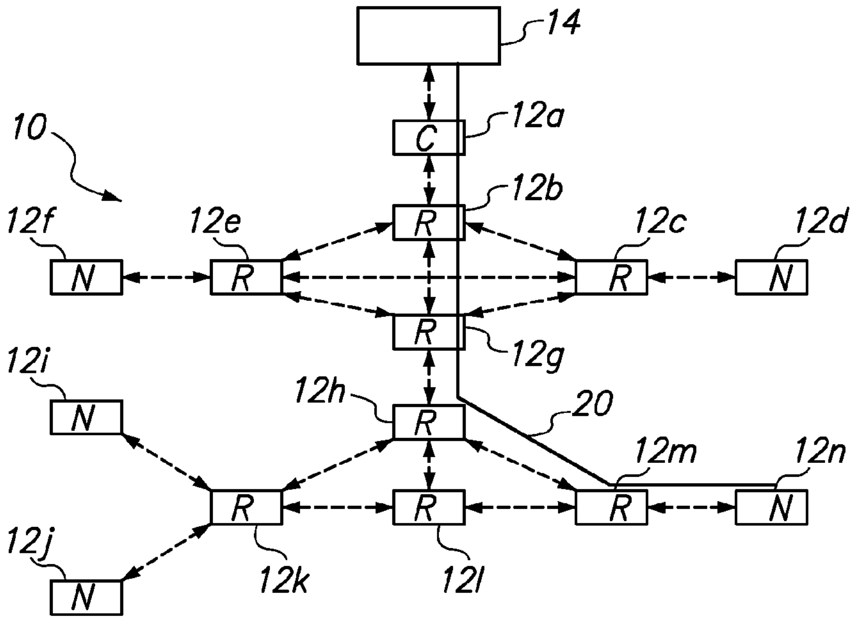
FIG. 2 is a diagram of the system of FIG. 1, which further illustrates the flow path of command signals from a remote control station to various traffic control assets in the system.

FIG. 2 illustrates the network nature of the traffic management system 10 according to several embodiments. In system 10, there can be a plurality of traffic control assets 12 that can function as command routers (R), which can route command from remote station 14 to remote asset 12, and relay data from remote assets 12 back to control station 14. A router is a traffic control asset that allows for passing through of commands to other assets that are more remote from control station 14. Traffic control assets 12*a*-12*d* in FIG. 2 can be example of traffic control assets that function as routers. The system 10 can further include several assets that function as nodes (N), i.e. as termination points for command from remote station 14. These assets can be thought of end points for commands coming from remote station 14. Traffic control asset 12*d* can be an example of a traffic control asset that functions as a node. Each asset 12 has the same electronic structure, as described below, but each asset can also be preconfigured before deployments via software to function as a router or a node, according to its position within the overall system 10.

Each asset 12 can be further configured in real time via a wireless path that can be represented by reference character 20. As shown in FIG. 2, path 20 represent a command that originated from the user at control station 14; the command is intended for traffic control asset (node) 12*n*. After being transmitted by control station 14, the command was received and passed on by traffic control assets 12*a*, 12*b*, 12*g*, 12*h*, 12*m* to 12*n*. From referring to FIG. 2, it can be seen that system 10 has network redundancies; there are alternative sequences of traffic control assets 12 that can be used to establish a path 20 to transmit a command from control station to traffic control asset 12*n*.

Figure 3:
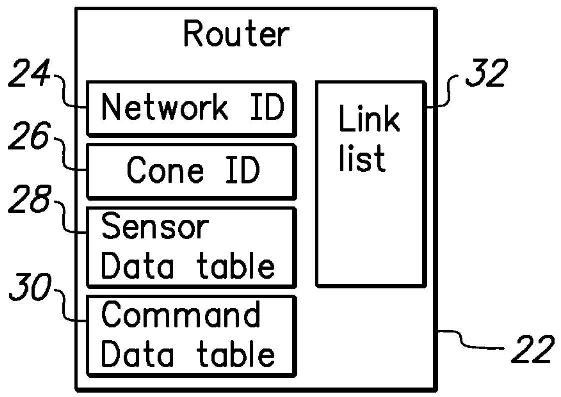
FIG. 3 is a depiction of the data that the traffic control assets might include for the system according to several embodiments.

FIG. 3 illustrates a block diagram of an asset data table 22 that can be included in each traffic control asset 12 to allow the asset 12 to be networked with other assets to establish that system 10. As shown in FIG. 3, asset data table 22 can include traffic Network ID data (represented by block 24) which can function to identify a network if more than one network has been established by system 10 in close proximity to each other. Each asset 12 in a given network must have the same network ID. Other network in closed area should have other network ID, and the network ID for each network in each system 10 is unique. Within the system 10, Asset ID (block 26 in FIG. 2) is the identification number of each traffic control asset in a same network. This Asset ID is different for every traffic control asset 12, and serves as an "address" in the traffic management network for system 10.

As shown by block 28, asset data table 22 can further include Sensor Data Table, which can temporarily store the newest and most up-to-date sensor data the traffic control sensors (described more fully below) have detected concerning traffic conditions. Each sensor on a traffic control asset 12 may be programmed to sample data continuously and update newest data in the Sensor Data Table. When users request to retrieve the data, the data will be sent to the user. Command Data Table 30 can be used to store commands that have been transmitted from the users at control station 14 and transmitted through the assets functioning as routers. These commands may include voice and visual commands. The asset microcontroller (FIG. 8) can periodically check if any command has been received from control station. The traffic control asset 12 microcontroller can execute command in the Command Data table in order received. Finally, asset data table 22 can include the data link list, depicted by block 32 in FIG. 3. The link list can be a list of Asset IDs (addresses) of Router(s) and/or Node(s) connect to it and the radiofrequency (RF) at which the asset 12 is linked with other assets 12.

The list of all Asset IDs of Router(s) and Node(s) in the link list 32 at each asset 12 may be sent back to the control station 14 periodically by asset software configuration or when the control station 14 request the link lists. The link lists also provide number of assets 12 and groups of assets 12 or network branches so that the control station 14 can generate a map of all assets 12 in the network and calculate routing paths from/to control station 14 and assets 12. For example of data contained in sensor data table 28 of a vehicle approaching. The sensor table may contains: (1) Distance and speed information of the vehicle provided by RADAR, (2) Location and approaching direction information provided by positioning sensor and orientation sensors, (3) Environment conditions provided by weather sensor, and (4) Timing provided by asset system clock.

In several embodiments, two antennas should be part of the sensor system. The antennas to fulfill both the transmit function and the receive function can be identical. Patch antennas can be a convenient way to provide the necessary communications link between the vehicle and various traffic control assets 16 on the path. The patch antennas can be circularly polarized. This can be achieved either by geometry or by a feed mechanism. A circularly polarized patch antenna has several advantages, namely: 1) Circular polarization minimizes polarization mismatch if the cone is knocked to the horizontal orientation; 2) A patch antenna is a resonant structure which rejects virtually all signals except those in a narrow band; 3) The patch is typically very thin and be conformal to the cone; 4) The patch can be made very small by increasing the dielectric constant of the substrate of the patch; and, 5) The antenna is efficient as long as the dielectric constant of the substrate is not too large. The resonant nature of the patch can be convenient in an electrically noisy environment.

Figure 4:
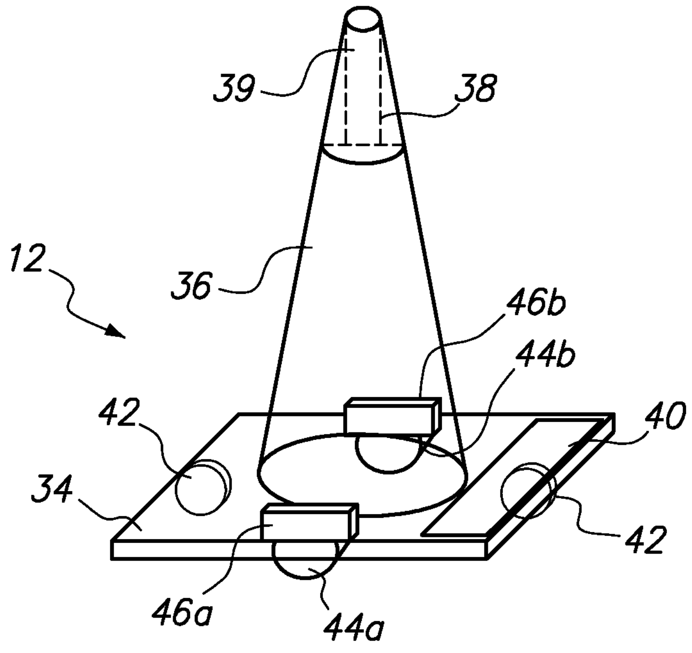
FIG. 4 is a traffic control asset that is configured as a traffic cone.

Referring now to FIG. 4, the structure of one embodiment of the traffic control asset 12 can be shown in greater detail. As shown, asset 12 can include a base 34 and a cone portion 36 that is attached to 34. Cone portion 36 can include an electronic control unit (ECU) 38, which can be incorporated into the cone portion 36. However, ECU 38 could also be incorporated onto the base 34 between base 34 and the interior defined by cone portion 36 in several embodiments. Some embodiments of asset 12 can further include a solar portion 40 that is fastened to the upward-facing surface of base 34. At least two casters 42 are attached to base 34, and wheels 44*a*, 44*b* are also attached thereto. Wheels 44*a*, 44*b* can be driven by corresponding motors 46*a*, 46*b*. The motors 46 can be in communication with ECU 38 to maneuver the traffic control asset 12 in response to a user's command from control station 14. The solar portion can convert sun energy into electricity to provide alternative power source for ECU and motors 46. The caster wheels 42 can prevent the cone from wobbling, while the wheels allow for maneuverability of the asset 12.

Figure 5A:
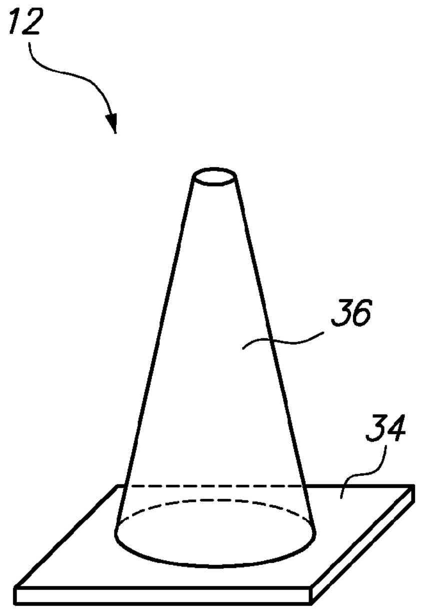
FIGS. 5A and 5B are illustrations of the traffic cone of FIG. 4, which further illustrate the traffic cone in a storage position and in a deployed configuration.
Figure 5B:
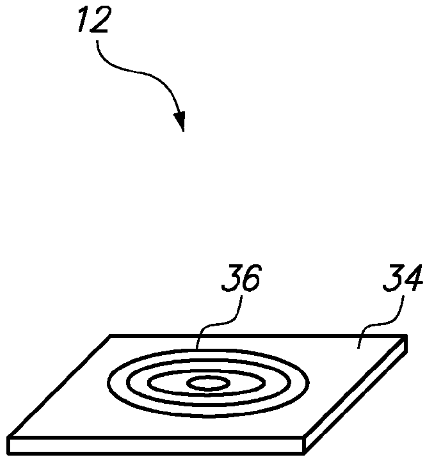
Figure 6A:
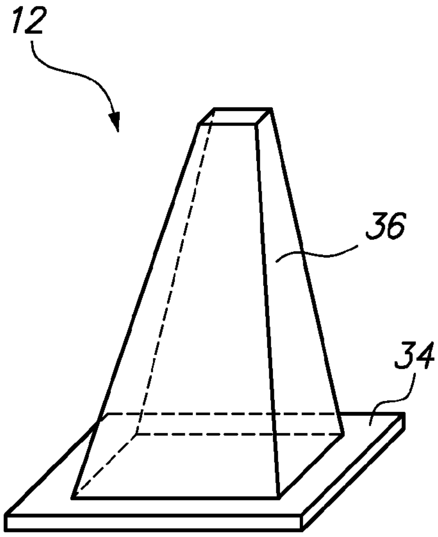
FIGS. 6A and 6B are illustrations of the traffic cone of FIG. 4, which further illustrate a pyramid configuration for the traffic cone in a storage position and in a deployed configuration.
Figure 6B:
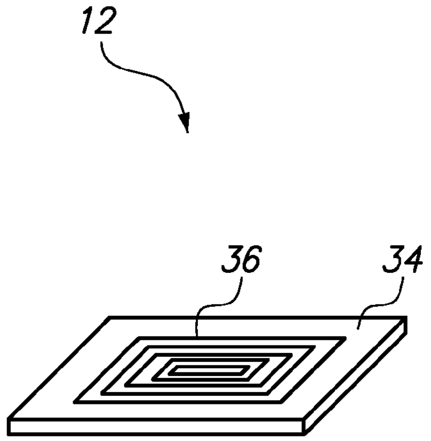

As shown by FIGS. 5B and 6B, the traffic control assets can have a storage configuration, wherein traffic control asset 12 is substantially flat. When in this configuration, cone portion 36 is collapsed against base 34. In this manner, the traffic control asset 12 can be constructed in such a way that many of them can stack on each other and they can be easy deployed, either manually or by automate machine. The assets that are traffic cones can further have a deployed position, wherein the cone portion 36 is fully extended to form the traffic cone, as shown in FIGS. 5A and 6A. To do this, a telescoping actuator (not shown) can be placed inside of cone portion and between cone portion 36 and base 34, and the actuator can be extended to further extend the cone portion and thereby deploy the traffic cone. Or, the cone portion can be made of an inflatable bladder, which can be inflated to extend the cone portion upright to thereby deploy the traffic cone. Cone portion 36 can also be formed in a manner which gives the traffic cone a somewhat pyramidal appearance, as best seen in FIG. 6A.

Figure 7A:
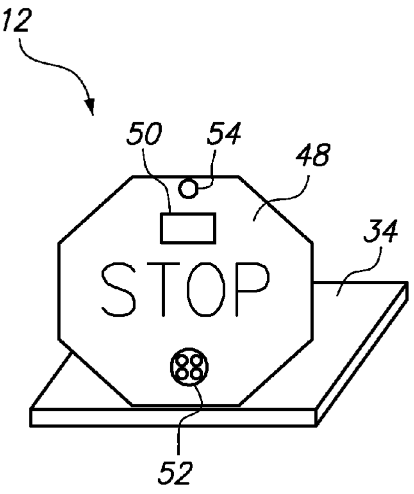
FIGS. 7A and 7B are drawings of a traffic control asset that is a stop sign in an deployed position and a storage position, respectively; and, FIG. 8 is a block diagram of the electronic control unit (ECU) for the traffic control asset of FIG. 2.
Figure 7B:
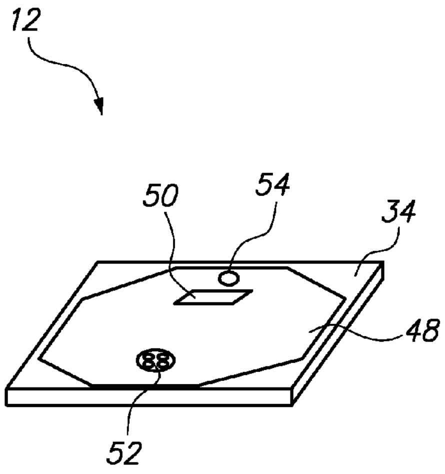

Referring now to FIGS. 7A and 7B, an alternative embodiment of the traffic control asset 12 can be shown. In several of these embodiments, a sign portion 48, such as an octagonal stop sign in several embodiments, can be hingedly attached to base 34 on one edge of sign portion, as shown in FIGS. 7A-7B. An actuator (not shown) can interconnect sign portion 48 and base 34. For deployment the actuator can pivot sign portion 48 from a storage position depicted in FIG. 7B, where the sign portion is proximate the base and substantially horizontal, to a deployed position shown in FIG. 7A, where the sign portion 48 is substantially vertical. The base 34 and the sign portion 48 are designed so that when the sign portion 48 is horizontal and the traffic control asset is in a storage configuration, they are formed a flat low perspective and force endurable object that a vehicle can run over.

The tasks of pushing up or pulling down the sign portion to deploy or storage the traffic control asset 12 can be controlled via a wireless link from control station 14, as described above. Or, a simple wireless remote control device with a push button can be used to control the sign portion up or down. A more complicated wireless remote device may have several buttons to control several signs and display and speaker to monitor video and audio at the scenes. A wireless remote control device may be mounted on a portion at a control station 14 or the device may be a handheld device.

On sign portion 48, besides the main sign "STOP" sign, various components can be added to increase the capability of to the asset to direct traffic. Specifically, light 50 and audio transducer 52 can be added to provide visual and audio aids to drivers and walkers as when the sign portion 48 is vertical (deployed). The light 50 may be able to display differences in color, differences in brightness and to either blink or provide a steady illumination. Audio transducer 52 may be able to sound buzzer and/or provide voice messages to vehicles 16 and particularly pedestrians 18 in proximity to the asset 12. The messages on the sign portion 48 may be painted, engraved, manually changeable, or they can be electronic displays (LED, LCD, etc.).

In some embodiments, a camera 54 can be added to traffic control asset 12, as shown in FIGS. 7A, 7B. The camera 54 can provide view of the vehicle fronts when sign portion 48 is vertical (deployed). Alternatively, sign portion can be horizontal (in the storage position) and camera 54 can be used to photograph the undercarriage of a vehicle 16, to check for contraband, explosive devices and the like. Light 50 may be used as lighting for the camera 54. In still other embodiment, other sensors such as motion sensors, chemical sensor, and weather condition sensors may also be integrated onto the asset for specific applications.

The aforementioned sensors can include car detection sensor (magnetic, metal, motion, infrared, sound, video means), human proximity sensor (motion, infrared, sound and video sensors). The global positioning system (GPS), compass and orientation sensor can provide geometry and location wherever the traffic control asset 12 is placed. The GPS, compass and orientation sensors can also provide position feedback once the traffic control asset 12 is re-positioned. Weather condition sensors including wind (anemometer), temperature, humidity, barometer sensor provide ambient conditions. The camera can be used to capture events happen in the area (such as the license plate of a vehicle that has ignored the traffic control asset, for example). The camera can also provide live video to viewer at remote control station 14 via the wireless network.

Figure 8:
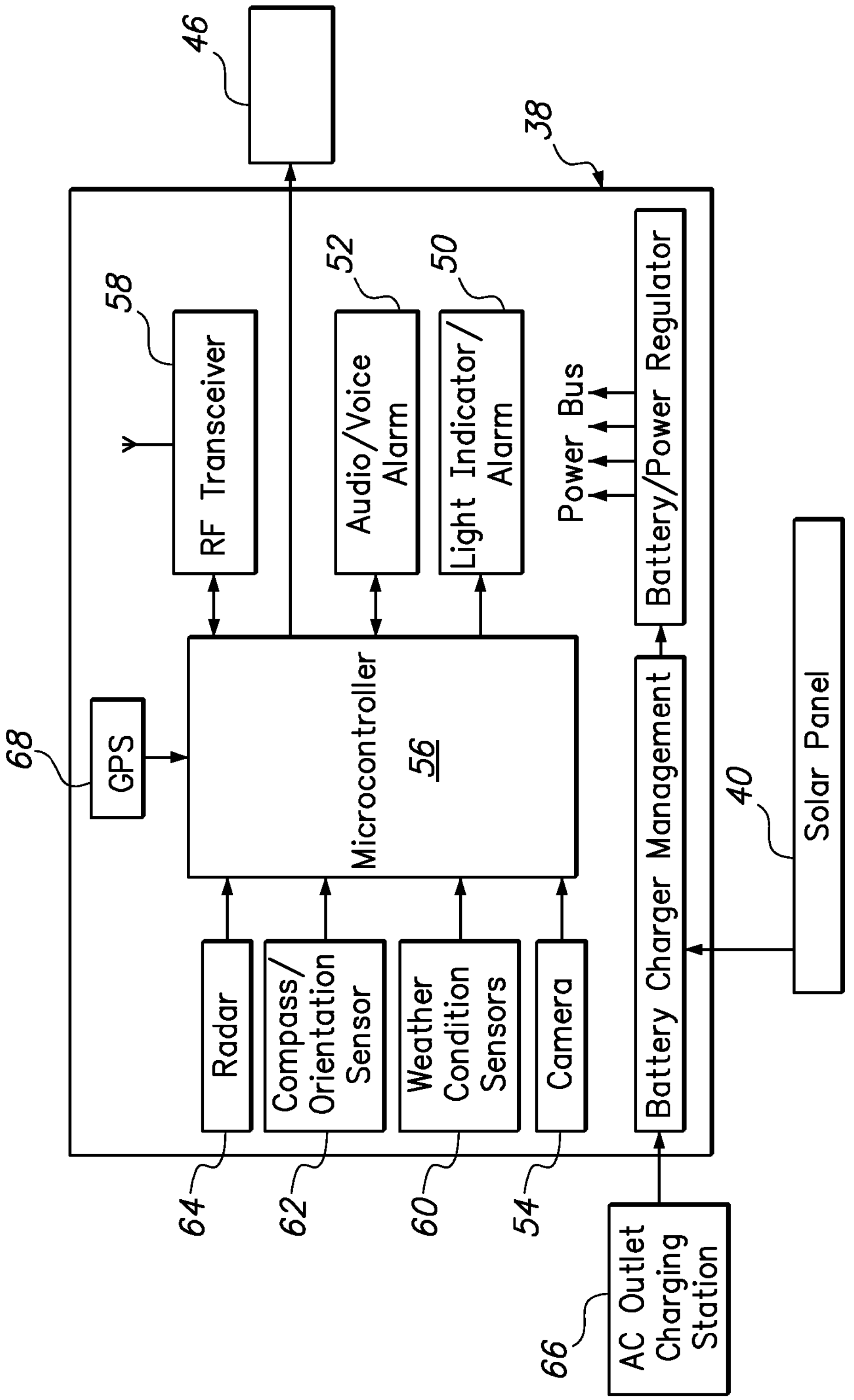

Referring now to FIG. 8, the inputs and output of the ECU 38 can be more fully illustrated. As shown, ECU can include a microcontroller 56, which receives inputs from control station 14 via RF transceiver 58. As shown in FIG. 8, the microcontroller 56 for ECU 38 is also in signal communication with audio/voice component 52, light 50 and camera 54, as well as with various specialty sensors, such as weather condition sensors, 60, compass/orientation sensors 62, and radar 64. The aforementioned solar panel 40 can also be connected to ECU to provide power; an AC outlet charging station 66 can also be provided as an alternative source of power for the asset 12. Traffic asset 12 may use batteries or external power supply depends on applications and situation.

The microcontroller 56 receives commands from control station 14 via the RF transceiver 58. In response to the comment, the microcontroller can provides a control signal to activate audio transducer 52, light 50, and the actuators to deploy traffic control assets having a cone portions 36 (to deploy asset 12 as a traffic cone), or to flip up the sign portion 48 (to deploy asset 12 as a stop sign). To re-position traffic control asset 12 in response to a command from control station 14, microcontroller 56 can send a signal to motors 46 that corresponds to he received command, to operate motors 46, which further turns wheels to move asset 12 to a desired position in response to the received comment. Compass/Position sensor 62 can provide feedback to microcontroller 56 as to the actual position of traffic asset 12. Or, microcontroller 36 can receive an input from GPS source 68 to determine its location, as shown in FIG. 8.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A traffic control system comprising:

a control station;

a plurality of traffic control assets in communication with said control station to establish a network;

wherein at least one of said plurality of traffic control assets is a traffic cone, each said traffic cone having an electronic control unit (ECU) incorporated into said traffic cone, said ECU in communication with said control station;

each of said traffic cones further including an orientation means and a means for communicating with each other; and, said plurality of traffic control assets being selectively activated from said control station.

2. The system of claim 1 wherein:

said traffic cone further comprises a locomotive means in signal communication with said ECU, said ECU receiving activation commands and movement commands from said control station; and, said locomotive means maneuvers said cone in response to a signal from said ECU that is representative of said movement command.

3. The system of claim 1, wherein at least one of said traffic control assets is a stop sign.

4. The system of claim 3, wherein said stop sign further comprises a base, a sign portion hingedly attached to said base, and an actuator interconnecting said base and said sign portion, said stop sign being in signal communication with said remote monitoring station, said actuator pivoting said sign portion away from base, from a horizontal stowed position to a vertical deployed position in response to a signal from said control station.

5. The system of claim 4, wherein:

said stop sign further comprises a locomotive means in signal communication with said ECU, said ECU receiving activation commands and movement commands from said control station; and, said locomotive means maneuvers said stop sign in response to a signal from said ECU that is representative of said movement command.

6. A traffic control system comprising:

a plurality of control assets, each said control asset having a radio frequency (RF) transceiver to establish an control asset network;

each said control asset including an electronic control unit (ECU) in communication with said transceiver;

each said control asset further being formed with a locomotive means in communication with said ECU, said locomotive means positioning said respective control asset in response to a signal from said ECU;

a remote monitoring station;

wherein at least one of said plurality of control assets is a traffic cone; and, wherein at least one of said plurality of said control assets is a stop sign, said stop sign further comprising a base, a sign portion hingedly attached to said base and an actuator interconnecting said base and said sign portion, said stop sign being in signal communication with said remote monitoring station, said actuator pivoting said sign portion away from base, from a horizontal stowed position to a vertical deployed position in response to a signal from said control station.

7. A method for remotely manipulating traffic flow, comprising the steps of:

A) providing a plurality of mobile traffic control assets;

B) establishing a control station remote from said traffic control assets;

C) networking said control station with said traffic control assets to establish a network;

D) selectively activating said traffic control assets from said control station; wherein at least one of said control assets is a traffic cone, and further wherein said step D) is accomplished using an electronic control unit (ECU) incorporated into said traffic cone, said ECU in communication with said control station; and, E) moving said plurality of traffic control assets.

8. The method of claim 7 wherein said traffic cone further comprises a base and at least two wheels attached to said base, and further wherein step D) further comprises the step of receiving a movement command from said control station, and step E) further comprises the step of transmitting a movement signal from said ECU to said wheels to re-position said traffic cone, said movement signal being representative of said movement command.

9. The method of claim 7 wherein at least one of said plurality of mobile traffic control assets is a stop sign comprising a base, a sign portion hingedly attached to said base, and at least two wheels attached to said base, and further wherein said step C) is accomplished using an electronic control unit (ECU) incorporated into said stop sign, said ECU in communication with said control station.

10. The method of claim 9 wherein said stop sign further includes an actuator interconnecting said base and said sign portion, and wherein said step D) is accomplished by to extend said actuator to cause said sign portion to move from a stowed configuration, wherein said sign portion is substantially horizontal, to a deployed configuration, wherein said sign portion is substantially vertical.

* * * * *